Figure 2:
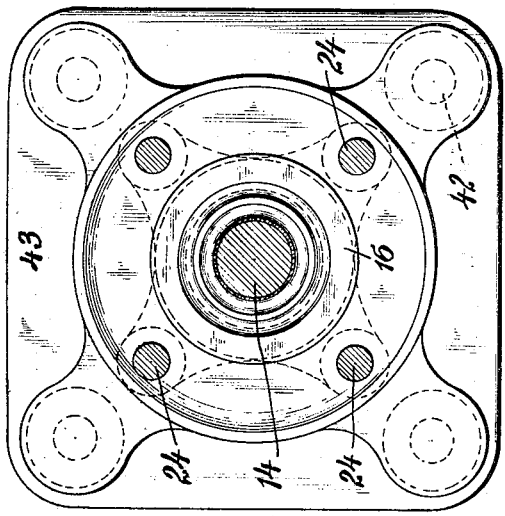

W. P. COHOE.
APPARATUS AND PROCESS FOR MAKING TUBES.
APPLICATION FILED AUG. 12, 1913.

1,163,740.

Patented Dec. 14, 1915.
3 SHEETS—SHEET 1.

WITNESSES:

INVENTOR

BY

ATTORNEYS

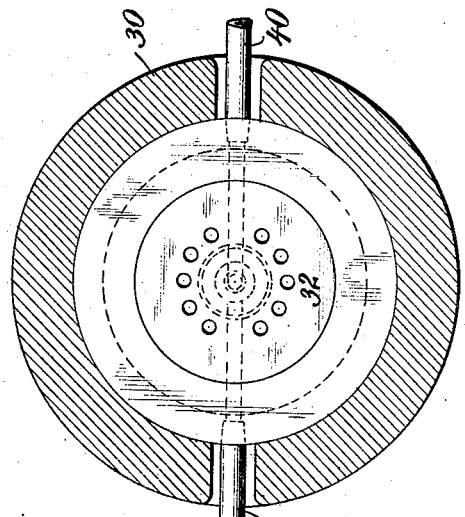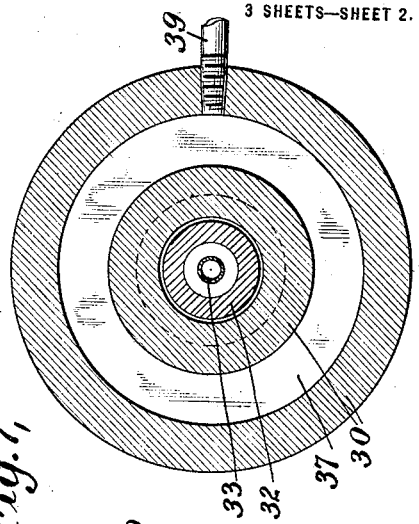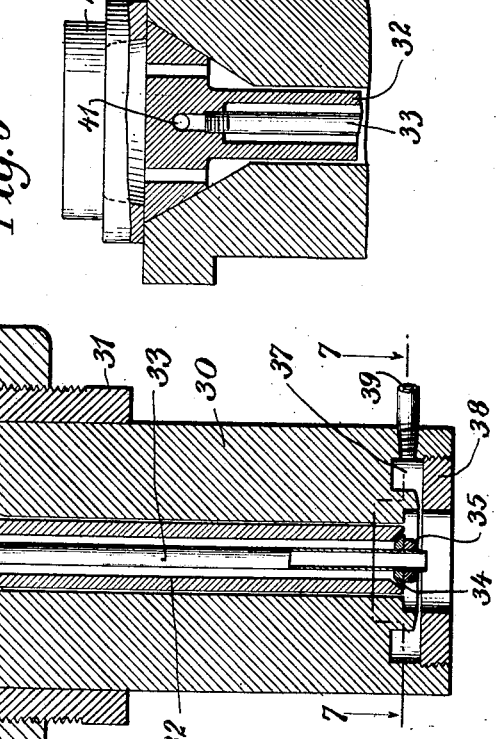

W. P. COHOE.
APPARATUS AND PROCESS FOR MAKING TUBES.
APPLICATION FILED AUG. 12, 1913.
1,163,740.
Patented Dec. 14, 1915.
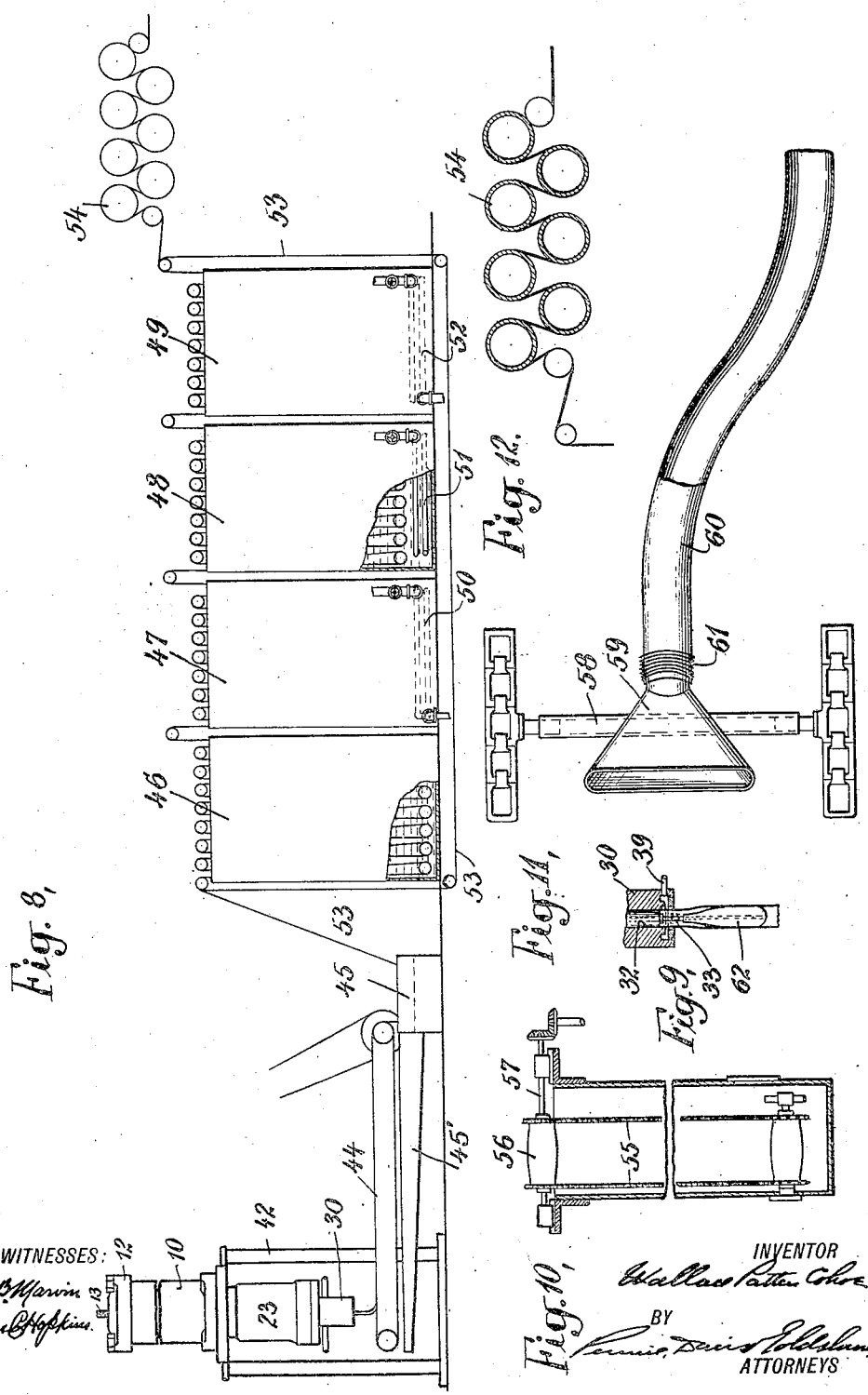

UNITED STATES PATENT OFFICE.

WALLACE PATTEN COHOE, OF TORONTO, ONTARIO, CANADA, ASSIGNOR OF ONE-THIRD TO THE WILLIAM DAVIES COMPANY, LIMITED, OF TORONTO, CANADA, A CORPORATION OF CANADA, AND ONE-THIRD TO EDWARD CAREY FOX, OF TORONTO, CANADA.

APPARATUS AND PROCESS FOR MAKING TUBES.

1,163,740.  Specification of Letters Patent.  Patented Dec. 14, 1915.

Application filed August 12, 1913. Serial No. 784,326.

*To all whom it may concern:*

Be it known that I, WALLACE PATTEN COHOE, a British subject, residing in the city of Toronto, county of York, Province of Ontario, Dominion of Canada, have invented certain new and useful Improvements in Apparatus and Processes for Making Tubes; and I do hereby declare the following to be a full, clear, and exact description of the invention, such as will enable others skilled in the art to which it appertains to make and use the same.

The present invention relates to the art of manufacturing tubes by extruding a plastic material through an annular die and then hardening or otherwise treating the extruded material to give it strength and permanence.

More particularly the invention is directed to the manufacture of tough pliant tubes of cellulose hydrate suitable for use as casings for sausages, though, as will hereinafter appear, many of the features of the apparatus and many of the steps of the process are applicable to the treatment of other materials and to the formation of tubes of varying characteristics and can be used with advantage under many different conditions for the production of extruded tubes of organic material.

The extrusion press hereinafter disclosed in detail includes a compression chamber from which a plastic material, such as viscose, may be expressed through the annular opening between a die and its core, and on emerging from the die as a thin-walled annular tube, may be quickly subjected to the coagulating and hardening effect of a suitable liquid such as ammonium chlorid, this liquid preferably being applied to the inside of the tube as well as to the outside. Simultaneously the tube may be expanded or puffed out with air under gentle pressure so that it will hold its shape while coagulating. Means are provided for carrying off this coagulated tube to suitable treating tanks where it is subjected to such washing and impregnating operations as will yield a thin-walled tube.

By treating a viscose tube according to the process hereinafter disclosed, it is possible to produce a casing appropriate for use in the manufacture of sausages, and having the necessary strength to be efficiently filled by the sausage machine and thin, flexible and pliable as required of such products. Furthermore, the casing is edible in the sense of not irritating the digestive organs.

The details of the apparatus whereby the result above outlined may be carried out and the details of the process involved in the production of cellulose hydrate tubes suitable for use as sausage casings, will become clear from the following detailed description which is to be taken in conjunction with the accompanying drawings, wherein—

Figure 3:
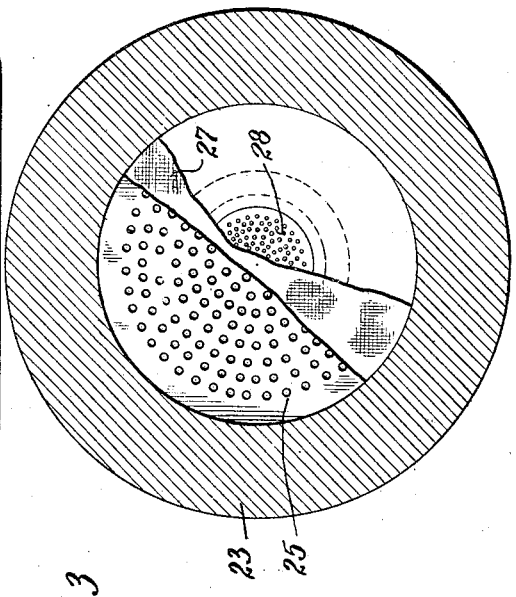
Figure 1:
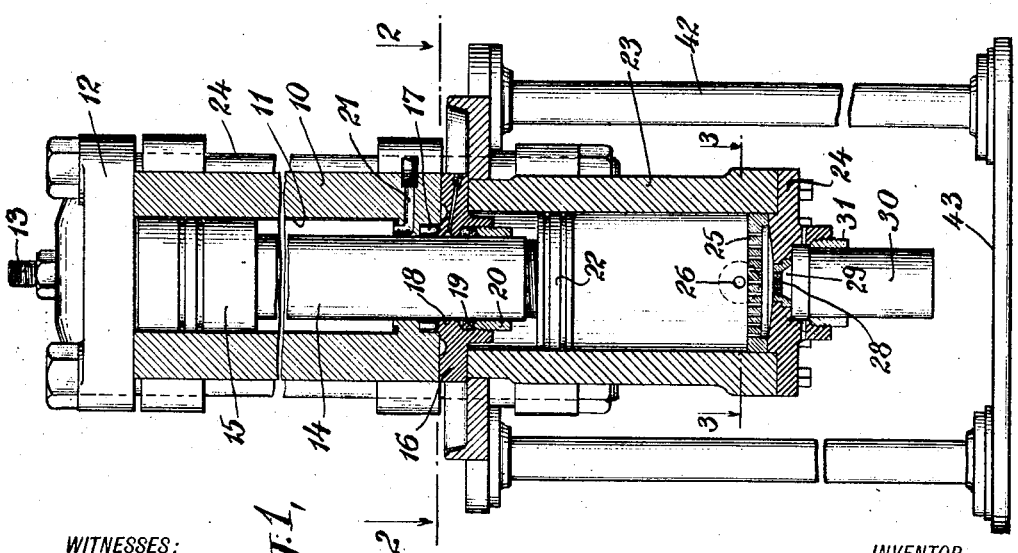

Figure 1 is a sectional elevation of the hydraulic press from which the plastic material is extruded; Fig. 2 is a sectional plan on the line 2, 2 of Fig. 1; Fig. 3 is a detailed section showing the strainer and mixing plates, the section being on the line 3, 3 of Fig. 1; Fig. 4 is a sectional elevation of the extruding die and its associated strainer plates and fluid supply pipes; Fig. 5 is a sectional plan along the line 5, 5 of Fig. 4; Fig. 6 is a detailed section through the head of the core of the die; Fig. 7 is a section through the extrusion die along the line 7, 7 of Fig. 4; Fig. 8 is a representation, somewhat diagrammatic, of the general arrangement of apparatus wherein the process here disclosed may be carried out; Fig. 9 shows a mandrel which may be mounted below the core of the die to expand the tube of extruded material and to assist in its support; Fig. 10 illustrates one turn of a link belt conveyer whereby the tube may be transported through the treating tanks; Fig. 11 illustrates one way of attaching the tube to the belt conveyer; and Fig. 12 illustrates a modified form of rolls over which the tube may be passed to dry it.

In the apparatus disclosed in the drawing, the hydraulic press comprises a cylinder 10 having its fluid chamber lined with a brass shell 11. It is surmounted by a head 12 having at its center an inlet pipe 13 through which water or other liquid under heavy pressure may be admitted to the cylinder to actuate the ram.

The ram 14 is provided at its upper end with a suitable driving head 15 and is closely enveloped in a thin brass tube having a close sliding fit through a gland block 16. This block is equipped with a packing collar 17 and an oil recess 18 and with a packing ring at 19 held in place by a brass nut 20, so that a fluid tight joint is assured and relatively high pressure may be applied to actuate the ram. Fluid may enter and leave the lower portion of the ram cylinder through a port 21.

Ram 14 carries at its lower end and screw-threaded thereon, a ram-head 22, snugly fitting within the material cylinder 23, and on its downward movement capable of extruding plastic material from that cylinder.

The material cylinder 23 and the ram cylinder 10 and its head 12 are all held together by suitable bolts 24 passing through lugs integral with the cylinders and with the head, and the gland block 16 is securely clamped between the cylinders.

At the lower end of the material cylinder 23 is a cylinder head 24 held in place by stud bolts and supporting the straining and mixing plates, and also the die and its core. The topmost straining plate 25 rests on cylinder head 24 and fills the entire lower end of the cylinder, and is provided with a great many holes, say one-eighth of an inch in diameter, and is recessed on its bottom face to form a mixing chamber wherein the plastic material, after it passes through the plate, may come together before moving further through the apparatus. The inlet for the plastic material to be extruded may be positioned at 26 (Fig. 1), somewhat above this plate 25. Immediately below plate 25, and clamped between it and the concaved upper face of cylinder head 24, is a disk 27 of wire gauze, which serves to further screen and mix the plastic material. Below the gauze and seated in a recess in the lower face of cylinder head 24 is a second straining and mixing plate 28 having holes very close together and of small diameter through which the material may be expressed into the chamber 29 formed by hollowing out the lower portion of block 28.

The die itself is in the form of a cylinder 30 having its upper flanged end seated within a recess in the cylinder head 24 and there held firmly in place against the cylinder head and against the lower edge of block 28 by means of a steel nut 31, externally threaded to engage with threads in the cylinder head. Within this die 30 and spaced therefrom to form an annular duct is a core 32, which has its upper portion in the form of a cone-shaped head fitted tightly to a cone-shaped recess in the die and clamped between the die and the lower rim of plate 28. This core 32 is hollow and carries centrally positioned therein a tube 33 the lower end of which carries an annular baffle 34 screw-threaded thereon and secured in position by a lock-nut 35. This baffle 34 is beveled to form with the beveled lower edge of core 32 an annular and outwardly flaring duct through which fluid which has been introduced into the core through pipe 36 may be spread outward against the inner face of a tube of extruded material issuing from the annular space between the die and its core. The lower portion of die 30 is hollowed out to form an annular chamber 37 having a closure 38 adjustably mounted in threaded engagement with the die to regulate the width of the annular slit through which a hardening fluid supplied to chamber 37 through pipe 39 may issue as an annular curtain directed inward against the outer wall of the tube of extruded material issuing from the die.

Air may be introduced within the extruded tube through pipe 33, this air entering pipe 33 from a supply pipe 40 and through a duct 41 leading to the center of the core head.

The entire hydraulic press is mounted on pedestals 42 carried by base 43 and is suitably positioned above the floor to permit the use of an endless conveyer 44 (Fig. 8) for receiving the tube of extruded material as it comes from the die. This conveyer may be of duck webbing and may lead to a tank 45 containing hardening or coagulating liquid and equipped with a trough 45' underlying the conveyer and positioned to receive the overflow of hardening liquid projected against the tube from annular chamber 37. From tank 45 the extruded tube may pass to a series of treating tanks 46, 47, 48 and 49, through which it can be carried by an endless conveyer of suitable construction. Tank 46 may be a lead lined wood tank containing sodium sulfite solution for removing sulfur compounds and other impurities from the tube, and tanks 47, 48 and 49 may be of steel with steam-heating coils 50, 51 and 52 therein, and may contain respectively hot glycerin for hardening, hot water for washing, and warm, dilute glycerin for final conditioning. The endless conveyer whereby the tube is carried through these tanks may consist of a duck web 53 passing loosely over rollers positioned at the top and bottom of the tanks, the tube being so attached to the canvas that its forward end will be distended as by means of a soft rubber funnel, so that it can receive liquid as the tube passes up and down in the tanks, thereby filling the tube with the treating liquid and subjecting its inside as well as its outside to the action of the liquid. From tank 49 the tube under treatment may pass to steam-heated drying drums 54, and there placed in final condition.

Figs. 10 and 11 show a modified form of endless conveyer comprising a pair of link belts 55 passing over sprockets carried on rollers 56, each roller being mounted to turn with a shaft 57 driven at an appropriate speed to carry the tube successively up and down through the treating liquid and finally over into the adjacent tank and so on through to the end of the series and into the drying rolls. As a means for attaching the tube to the link belts there may be provided a cross-bar 58 pivotally connected to each belt of the conveyer and carrying a flattened and flexible rubber funnel 59, the small end of which is shaped to receive the forward end of the tube 60 under treatment, which may there be clamped in position by a suitable fastening 61. With this arrangement the tube is progressively advanced with the chain and passes successively over the rollers 56, and its movement up and down through the liquids of the treating tanks takes up the liquid so that it is treated inside as well as outside.

The chemical composition of the several treating baths and other details of the operation must of course vary in accordance with the nature of the material from which the tubes are being made, and even in making thin-walled tubes of cellulose hydrate for use as sausage casings, many of the steps may be varied and still yield a satisfactory product; but according to the preferred method the operation of the apparatus may be described in detail as follows: Viscose made according to standard methods is introduced into the material chamber of the hydraulic press through the inlet 26 and is there subjected to compression by the hydraulic ram, and is squeezed through the small openings in plate 25 into the chamber below. This strains and thoroughly mixes the material, breaking up any lumps and tending to exclude any air bubbles. With unaged viscose the presence of lumps is not ordinarily noticeable, but as it ripens, centers may develop which, but for a thorough mechanical treatment, might give a lack of uniformity in the product. The viscose next passes through screen 27 and through the perforations of plate 28 into the chamber 29 and then through holes in the head of the core and, ultimately, into the flaring opening of the die, where it is squeezed downward through the annular space separating die 30 from its core 32, finally issuing from the die as a continuous tube, soft, flexible and pliant. The annular space of the die may vary in length in accordance with the diameter of the tube, but it is good practice to have the annular space of a length at least four times the diameter of the tube which is extruded. Working with viscose, it is not necessary either to heat or to cool the die, but if the press is being used with other materials such, for instance, as gelatin it has been found advantageous to heat the material cylinder and to cool the die, making use of suitable jackets through which the heating or cooling medium can be circulated.

It is an important feature of the present process that as the viscose issues from the die it is subjected to the coagulating action of a suitable fluid. This coagulation maintains the tube in a solid, coherent form capable of being handled and finished by the succeeding operations. Ammonium chlorid may be used as the coagulating liquid for viscose and, preferably, is applied to the outside of the tube from chamber 37 through its annular jetting orifice simultaneously with the application of a similar solution projected against the inside of the tube at baffle 34. In addition to this, it is advantageous to distend the tube as it issues from the die, and this is effected by means of air delivered under gentle pressure through pipe 33, by which means the tube can be distended until coagulation is complete.

Working with viscose, the extruded tube is allowed to descend for a distance as great as the strength of the tube will permit, and then is caught on the traveling belt 44 and carried off for further treatment. The speed of the belt is regulated to coördinate with the speed of extrusion.

In working with tubes of relatively large diameter, the distance which the tube can descend before reaching the belt can be increased by use of the device illustrated in Fig. 9. This device consists of a torpedo-shaped mandrel 62 mounted on the end of tube 33, and of such diameter as to offer some frictional resistance to the descent of the partially coagulated tube, thus assisting in its support, and forcing the coagulating liquid closely against the inner wall of the tube. The air used for distending the tube may pass through this mandrel and, as in the case when no mandrel is used, will hold the tube distended throughout a considerable portion of its subsequent travel.

If belt 44 is of cotton duck it may be guided at the sides by rollers so that it is trough-shaped during the early part of its travel, and this continuously moving trough partially filled by the excess of coagulant flowing down the outside of the extruded tube will carry the tube along until it has had sufficient exposure to the coagulant. The tube is kept inflated during the whole period of its travel on the belt, and at the end drops off into the tank 45 where the coagulant is caught and stored for ultimate return for re-use by means of suitable circulating pumps.

Many other coagulants than ammonium chlorid can be used. If, for example, the cellulose solution is a cellulose nitrate solution, a cupra-ammonium solution, or a zinc chlorid solution, coagulants suitable for use with these substances may be employed.

The subsequent treatment of the coagulated extruded tube consists essentially in its purification, hardening and drying. As the tube comes from the machine in the long lengths in which it is formed, it is attached to the traveling conveyer 53, as shown in Fig. 11, and the traveling funnel 59 to which it is secured takes up the solution through which it is passing, and this solution bathes the inside of the tube simultaneously with the treatment of its outside. Also, as the funnel passes up and down over the rollers in the different tanks, there is a slight excess of pressure caused by the inflow of liquid into the funnel, so that the tube during the whole of its treatment is subjected to a slight distension which is beneficial in producing a greater ultimate strength in the finished product than would otherwise be the case.

In making tubes from viscose the liquid of the first treating tank may be a saturated sodium sulfite. This solution is usually kept acid by means of sodium bi-sulfite. When the tube emerges from this bath it will be found to have lost largely, if not entirely, its yellow color.

The tube next enters a solution which hardens it and renders it insoluble in water. A number of different substances may be used for this purpose, but a hot 25% to 30% solution of glycerin at a temperature in the neighborhood of 100° C. is suitable. Five minutes' treatment is quite long enough for a tube having a wall thickness up to .030 inches and will harden it so that boiling water does not soften it.

The hardened tube is next led into boiling water the effect of which is to purify the tube from all soluble salts or substances which may be present in it. More than one washing tank may be used, and by using a plurality of tanks any glycerin passing over from the glycerin tank may be recovered from the first of the series.

After passing from the last washing tank the tube is again subjected to hot dilute glycerin, the object being to introduce into the tube enough glycerin to keep it flexible when finished, cellulose hydrate not thus impregnated being somewhat too stiff and inelastic for most satisfactory results. When the tube comes from this glycerin tank it may be passed over drying rolls for the removal of moisture. Before the visible moisture has passed away in the drying process, the tube may be rubbed with an oil (as for instance, soy bean oil) which has the effect of keeping out moisture when the tube is finished, and also tends toward greater flexibility. Finally the tube is passed over rolls heated warm enough to cause a loss of water of composition and the consequent contraction which is characteristic of viscose during this loss. The heating rolls may vary in design and may with advantage be hollow rolls as indicated in Fig. 12, steam-heated in accordance with the practice of paper manufacturers, though the rolls need not be so large nor run at such high speed as for the manufacture of paper.

In some cases it has been found desirable to avoid passing the tubes over rolls hot enough to cause a loss of water of composition, in which case after the washing bath the tube is passed through a tank of anhydrous glycerin heated to a temperature of 120° C. This removes the water of composition. The tube is then passed through dilute glycerin to remove the excess of anhydrous glycerin and then is dried either by air or on moderately heated rolls.

The final product in its preferred condition with the water of hydration substantially driven off, probably consists of substantially pure cellulose except for the glycerin addition, and in this form presents maximum efficiency for use as a sausage casing. It is almost identical in appearance with sausage casings made from the intestines of sheep, hogs and oxen, and on account of its purity and the aseptic conditions under which it is prepared, it is sanitary and presents no difficulty of preservation from putrescence when kept in storage. It is absolutely non-fibrous and is edible and can be used in the manufacture of sausages generally, including not only sausages of the bologna cervelat type but also those intended for boiling, frying or broiling.

It will, of course, be understood that the length of the tube or casing will depend upon the choice of the operator, who may so conduct the manufacture that the tube produced will be of a length corresponding to a single charge of the cylinder, or of greater length by re-charging the cylinder before its prior charge is exhausted. It is preferable, however, to make the tube of such lengths that it will substantially clear itself of the solution contained in one tank before entering the next succeeding one of the series, so as to avoid as far as possible intermingling of the solutions and to obtain the most advantageous action of each solution for its particular function.

What I claim is:—

1. An extrusion press for the manufacture of tubes from organic material, comprising a material chamber, a die having a core forming an annular passage through which material may be extruded from said chamber, means for delivering a treating fluid in an annular stream against the exterior of the material issuing from the die and means for preventing said tube from collapsing on itself while being treated.

2. An extrusion press for organic material, comprising a material chamber, a die associated with said chamber and having a core spaced from the die to form an annular extrusion passage, means for forcing material from said chamber through said annular passage as a continuous tube, means for applying a hardening fluid to the inside of said tube simultaneously with its issue from the die and means for distending the tube from within while the hardening fluid is acting thereon.

3. An extrusion press for organic materials comprising in combination a material chamber, a die connected therewith, said die having an annular passage, means for forcing material from said chamber through said annular passage as a continuous thin walled tube, and means for applying a hardening fluid to the inside and to the outside of said tube simultaneously with its issue from the die and means for distending said tube from within until the tube is hardened by said fluid.

4. An extrusion press for organic materials comprising in combination a material chamber, a die having an annular passage leading from said chamber, means for extruding material through said die as a continuous thin walled tube, means for delivering a hardening fluid on said tube simultaneously with its issue from the die and means for maintaining a fluid pressure within said tube to distend the same as it issues from the die.

5. In a press for the manufacture of continuous tubes suitable for use as sausage casings, the combination of a material chamber, a die connected therewith and having a core forming with the opening in said die an annular passage through which material from said chamber may issue as a thin walled tube, means for delivering a hardening liquid against the inside and the outside of said tube as it issues from the die, and means for simultaneously maintaining a gentle air pressure within said tube to distend it as it issues from the die.

6. In an extrusion press for organic materials, the combination of a material chamber, a die secured to said chamber and having an annular passage from which the material under treatment may issue as a thin walled tube, perforated plates at the base of said chamber through which said material must pass, and means for introducing fluid within said tube to distend the same as it issues from the die.

7. In an extrusion press for the manufacture of sausage casings, the combination of a material cylinder, an annular die at the base of said cylinder, a hydraulic ram working in said cylinder to extrude material therefrom through said die in the form of a tube, a hollow core for said die, and means for introducing fluid through said core simultaneously with the delivery of material from the die.

8. In an apparatus for the production of tubes of organic material, the combination of a tubular die having a core forming with the wall of the die an annular passage through which material may pass as a thin walled tube, means for delivering an annular stream of hardening liquid against the outside of said tube as it issues from the die, and means for simultaneously distending said tube and delivering a hardening liquid on the inside thereof.

9. In an apparatus for the production of sausage casings from cellulose hydrate, the combination with an extrusion press having an annular passage through which material may be delivered as a thin walled tube and at which the tube may be subjected to the coagulating action of a suitable liquid, of a conveyer whereon said tube may be transported while undergoing coagulation, and treating baths and drying rolls through which said tube may be passed as a continuous length and at which it is purified, washed and dried.

10. The process which consists in extruding viscose as a seamless non-fibrous tube suitable for use as sausage casings and subjecting said tube to the action of a coagulating fluid simultaneously with its delivery from the extruding means.

11. In the manufacture of sausage casings from cellulose hydrate, the process which consists in extruding viscose as a seamless non-fibrous tube, and simultaneously coagulating the viscose to retain its tubular shape.

12. The process which consists in extruding organic material as a continuous, seamless, non-fibrous tube and simultaneously subjecting the outside and inside of the tube to the coagulating action of a suitable fluid.

13. In the manufacture of sausage casings, the process which consists in extruding viscose as a seamless non-fibrous tube and distending the tube and subjecting it to the coagulating action of a suitable fluid simultaneously with its issue from the extrusion apparatus.

14. In the production of sausage casings of cellulose hydrate, the process which consists in expressing viscose through an annular passage in the form of a continuous, seamless tube, and subjecting said tube on the inside and the outside to the coagulating action of ammonium chlorid to give permanence to the tubular shape of the material.

15. The method which consists in extruding viscose through an annular passage to form a continuous tube, and introducing air within the tube as it issues from said passage to distend the same simultaneously with its delivery from the passage.

16. The method which consists in extruding viscose through an annular passage to form a seamless non-fibrous tube, and subjecting said tube immediately on its issue from said passage to the hardening action of a coagulating liquid, and maintaining effective contact between said liquid and said tube during subsequent transportation of the tube until coagulation is complete enough to give permanence to the tubular form of the material.

17. In the manufacture of sausage casings of cellulose hydrate, the method which consists in expressing the viscose through a series of small openings to strain the material and insure uniformity, extruding the material thus treated through an annular passage to form it into a continuous seamless tube, distending the tube with air as it issues from the passage, and simultaneously treating with a coagulating liquid, and transporting said tube for further treatment in the continuous form in which it issues from the passage and while still distended and exposed to coagulating action.

18. In the manufacture of sausage casings from cellulose hydrate, the method of softening a tube of coagulated viscose, which consists in subjecting the tube after suitable purification to the tempering action of a hot solution of dilute glycerin.

19. In the manufacture of sausage casings of cellulose hydrate, the process which consists in extruding viscose through an annular passage to form a continuous seamless tube of non-fibrous material, expanding said tube with gentle air pressure simultaneously with its issue from the passage, exposing the tube inside and outside to the coagulating action of ammonium chlorid, transporting said material as a continuous tube while still subjected to the action of the ammonium chlorid, delivering the tube continually to a solution of sodium sulfite for the removal of sulfur compounds, subjecting the tube thus purified to the action of hot glycerin, washing with hot water to remove soluble impurities, treating with glycerin to render the material pliant and drying to yield a final product consisting essentially of cellulose hydrate impregnated with glycerin.

In testimony whereof I affix my signature, in presence of two witnesses.

WALLACE PATTEN COHOE.

Witnesses:
H. M. CHRISTMAN,
R. S. CHILTON.